March 2, 1954
W. C. CARLISLE ET AL
2,670,922
CHECK VALVE
Filed April 7, 1951
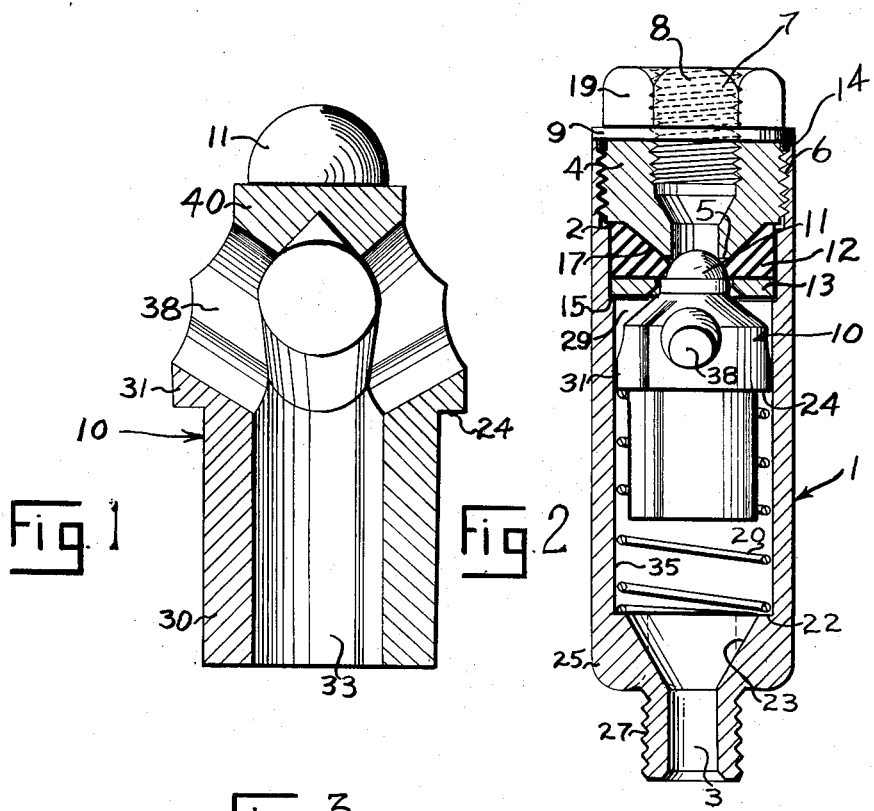
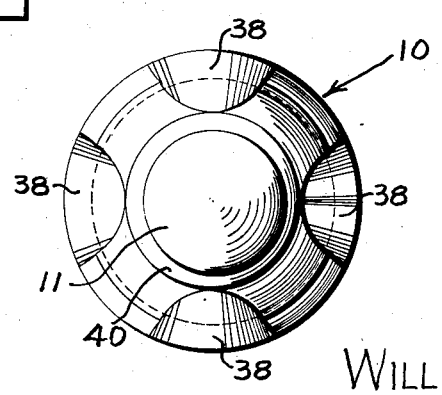
WILLIS C. CARLISLE
JOHN H. McCARVELL
INVENTOR.
BY Lester B. Clark
ATTORNEY.

Patented Mar. 2, 1954

2,670,922

UNITED STATES PATENT OFFICE 2,670,922

CHECK VALVE

Willis C. Carlisle and John H. McCarvell, Houston, Tex., assignors to Macco Oil Tool Company, Inc., a corporation of Texas Application April 7, 1951, Serial No. 219,808

1 Claim. (Cl. 251—144)

This invention relates to a valve construction of the general type known as a check valve and is particularly suitable for use in a well to control the flow of pressure fluid in elevating the well fluids to the surface.

This invention has been briefly referred to in our copending application 208,202, filed January 27, 1951, now Patent No. 2,610,644, granted September 16, 1952, wherein the check valve of this invention is shown in combination with a flow valve and a well tubing.

One of the objects of this invention is to provide a check valve construction which will eliminate excessive wear on the valve member when the fluid under pressure enters the valve. Such wear results in what is commonly called "wire drawing." It is generally believed that such "wire drawing" results from uneven or irregular displacement of the check valve member or plunger member from its valve seat, causing small orifices between the valve seat and the check valve member, which in turn permits the fluid to wear away the face of the valve seat and the check valve member in the form of narrow grooves or "wires."

Another object of this invention is to provide a check valve that is compact, easy to handle and transfer from one location to another and which can be readily separated into its component parts for cleaning and replacement.

Still another object of this invention is to provide a check valve unit which has a fixed but removable valve seat in a housing, and a hollow check valve member which serves to open and close the inlet when fluid pressure is applied upon it.

An additional object is to provide a check valve member which is slidable in a valve housing and is also hollow so that substantially all of the fluid which goes into the valve must pass through the lateral passages and hollow stem of the check valve member.

Still a further object of this invention is to provide a check valve for use in connection with flow valves in elevating the well fluids to the surfaces, the valve to have a ring and a washer interposed between the check valve member and its valve seat, the ring and washer serving as a portion of the valve seat member.

A still further object is to provide a coil spring to urge the valve member to closed and sealing position and through which the flow of fluid will pass to avoid wear and corrosion.

Other and further objects will be readily apparent when the following description is considered in connection with the accompanying drawings wherein:

Fig. 1 is a side elevation showing the check valve member of this invention partly in section and illustrating the hollow stem and angular or lateral passages through the valve member in operative connection therewith.

Fig. 2 is a side elevation showing the complete check valve of this invention and illustrating the novel check valve member in closed position so that the flow is through the hollow valve and spring. In actual operation the valve, may be inverted in some instances.

Fig. 3 is a top view of the check valve member of Fig. 1 showing the details of the angular or lateral passages with relation to the valve seat engaging portion or tip of the check valve member.

A more detailed description of the drawings follows wherein like numerals of reference designate like parts in all figures of the drawing.

Referring first to Fig. 2, it can be seen that a valve housing 1 is shown as hollow with a fluid flow opening 2 in one end and another fluid flow opening 3 in the opposite end. Within the opening 2 is located a plug 4 which has a valve seat 5 thereon. Plug 4 is provided with threads 6 which engage corresponding threads on the inside of housing 1 at fluid flow opening 2. Plug 4 has a passage 8 therethrough so that it only partially plugs opening 2. Threads 7 may be provided in passage 8 for attachment to a piping section (not shown) or any other suitable device. A seal ring 14 may be provided at the undersurface of flange 9 as shown in Fig. 2; such seal ring 14 may be attached either to the plug 4 or to the valve housing 1, but it is preferably attached to plug 4. To enable plug 4 to be turned with a wrench if necessary, a multi flat sided head 19 forms the upper part of plug 4.

Check valve member or plunger member 10 is located within housing 1 and is slidable coaxially of the walls of housing 1. When fluid is not exerting a force on the plunger member 10 through passage 8, member 10 is in a normally closed position as shown in Fig. 2. In such closed position, the engaging portion or ball 11 of the valve member 10 is in contact with the valve seat 5. To obtain a more perfect seal, there may be additionally inserted a washer 12 and a ring 13 which together form a valve seat seal. The washer 12 may be made of rubber or synthetic materials such as "Hycar," or any other suitable resilient material. It has been found, however, that "Hycar" is the most desirable for normal service. The ring 13 is preferably made of metal. Washer 12 and ring 13 are separate from each other and both are prevented from axial movement by engagement of ring 13 with an internal abutment 15 in housing 1 and engagement of washer 12 with the inclined face 17 of plug 4. When a fluid enters passage 8, plunger member 10 will move axially in the housing toward opening 3.

To keep the plunger member 10 in engagement with ring 13, washer 12 and valve seat 5 a resilient means or spring 20 is provided in the housing. This spring 20 seats upon an internal shelf 22 and is located between the shelf 22 and an extending shoulder 24. When plug 4 is screwed into housing 1, valve seat 5 engages ball 11 of plunger member 10 which forces plunger member 10 downwardly against spring 20. Thus, spring 20 will normally be under tension even when in closed position. This tension urges plunger member 10 into a tight fit with the valve seat 5 and washer 12. The amount of pressure which will be required to open this valve can be determined by the resistance offered by the resilient means 20 as it bears on shoulder 24 and shelf 22. From shoulder 22 an inclined slope 23 may be provided down to opening 3. A multi flat-sided head 25 may be provided on housing 1 for turning housing 1 with a wrench. Threads 27 exterior of inlet opening 3 may be employed to connect with flow valve (not shown) such as in application 208,202 above referred to, or any other suitable device.

Above plunger member 10 and below ring 13 is located a valve chamber 29. A lip 31 is provided on plunger member 10 to engage the inner walls 35 of valve housing 1 and prevent flow of fluid past that point. It is believed apparent that when fluid enters passage 8 in sufficient force to move ball 11 away from valve seat 5, the fluid will enter valve chamber 29 and because it will be prevented from passing lip 31, it will necessarily pass through lateral inclined channels 38 in plunger member 10, hereinafter more fully described.

Referring now to Figs. 1 and 3 in particular wherein plunger member 10 is shown, it can be seen that this member 10 is composed of a valve seat engaging portion or ball 11 and a body portion 30 integral therewith. Included in the body portion 30 are lateral inclined passages 38 which connect with hollow stem 33. The ball 11 is not entirely round and is integral with a collar 40 located just above said inclined passages 38. Lip 31 is located just below inclined passages 38 and provides the surface for engaging wall 35 of housing 1 for sliding movement within said housing. Below lip 31 is provided a shoulder 24 which serves as a seat for one end of spring 20, as previously stated.

A plurality of inclined passages 38 may be formed in order to provide greatest fluid passage possible; it is desirable that the area of passages 38 at least equal the area of the hollow stem 33 and therefore a plurality of passages 38 are preferably used. Passages 38 are preferably inclined so as to reduce the flow restriction to hollow stem 33, but passages 38 may be perpendicular to hollow stem 33, if desired.

In the normal operation of the check valve of this invention, the fluid enters passage 8, presses against plunger member 10 and when the fluid pressure exceeds the resistance offered by the spring 20 the plunger member 10 is unseated from valve seat 5, washer 12 and ring 13 and then fluid enters the valve chamber 29 in housing 1. Since lip 31 of the plunger member 10 is a close fit with the inner wall of housing 1, substantially all of the fluid passes through the angular passages 38 to hollow stem 33 and then to the opening 3. The large amount of fluid passage possibly can be readily seen.

Broadly, this invention contemplates a check valve with a hollow check valve member.

What is claimed is:

A check valve comprising a hollow valve housing, fluid flow openings on each end of said housing, a plug positioned in one end of said housing to partially close one of said openings, a passage through said plug, threads on the outside of said plug, corresponding threads on the valve housing to engage said threads on said plug, a valve seat on said plug, a hollow plunger member movable in said housing, said plunger member including a hollow stem as its lower portion, lateral inclined passages in said plunger member connecting with said hollow stem, a ball adjacent said lateral inclined passages, a spring in said housing, an extending shoulder on said plunger member, an internal shelf in said housing, said spring engageably positioned between said shoulder and said shelf to urge said plunger member toward said valve seat, an internal abutment in said housing, a valve seat seal including a metal ring and a resilient washer interposed between said valve seat and said plunger member, said internal abutment serving to prevent axial movement of said valve seat seal.

WILLIS C. CARLISLE.
JOHN H. McCARVELL.

References Cited in the file of this patent

UNITED STATES PATENTS

| Number | Name | Date |
| --- | --- | --- |
| 583,668 | Bowen | June 1, 1897 |
| 811,185 | Ten Eyck | Jan. 30, 1906 |
| 1,302,844 | Pepler | May 6, 1919 |
| 1,365,820 | Dennis | Jan. 18, 1921 |
| 1,707,660 | Hammerstein | Mar. 11, 1929 |
| 2,234,932 | Schlaupitz | Mar. 11, 1941 |
| 2,322,139 | Kaelin | June 15, 1943 |
| 2,353,161 | Heigis et al. | July 11, 1944 |